(12) United States Patent
McConnell

(10) Patent No.: US 6,560,327 B1
(45) Date of Patent: May 6, 2003

(54) METHOD AND SYSTEM FOR PROVIDING TELECOMMUNICATIONS SERVICES USING MEDIATED SERVICE LOGIC

(75) Inventor: Von K. McConnell, Leawood, KS (US)

(73) Assignee: Sprint Spectrum, L.P., Overland Park, KS (US)

(*) Notice: Subject to any disclaimer, the term of this patent is extended or adjusted under 35 U.S.C. 154(b) by 0 days.

(21) Appl. No.: 09/410,869

(22) Filed: Oct. 1, 1999

(51) Int. Cl.[7] ............................................... H04M 7/00
(52) U.S. Cl. .................... 379/229; 379/221.09; 379/219
(58) Field of Search .......................... 379/207.02, 229, 379/230, 221.08, 221.09, 221.1, 221.11, 221.12; 370/352, 353; 455/445

(56) References Cited

U.S. PATENT DOCUMENTS

| | | | |
|---|---|---|---|
| 4,191,860 A | 3/1980 | Weber | 379/115.01 |
| 5,311,572 A | 5/1994 | Friedes | 379/211.02 |
| 5,329,589 A | 7/1994 | Fraser | 379/91.02 |
| 5,353,331 A | 10/1994 | Emergy | 455/461 |
| 5,386,467 A | 1/1995 | Ahmad | 379/221.08 |
| 5,430,719 A | 7/1995 | Weisser, Jr. | 370/389 |
| 5,438,568 A | * 8/1995 | Weisser, Jr. | 370/389 |
| 5,469,496 A | 11/1995 | Emery | 455/461 |
| 5,506,887 A | 4/1996 | Emergy | 455/461 |
| 5,517,562 A | 5/1996 | McConnell | 379/201.03 |
| 5,566,235 A | 10/1996 | Hetz | 379/221.02 |
| 5,574,783 A | 11/1996 | Dunn | 379/230 |
| 5,581,610 A | 12/1996 | Hooshiari | 379/133 |

(List continued on next page.)

OTHER PUBLICATIONS

Ram P. Batni, "Advent & Use of Intelligent Network (IN) Technology in Wireless Networks," *IEC IN World Forum '99*, pp 17–28 (Mar. 29, 1999).

Richard Tam, "Towards Ubiquitous Wireless Intelligent Networks," *IEC IN World Forum '99*, pp 29–38 (Mar. 29, 1999).

(List continued on next page.)

*Primary Examiner*—Benny Q. Tieu
(74) *Attorney, Agent, or Firm*—Harley R. Ball; Steven J. Funk; Kevin D. Robb

(57) ABSTRACT

A method and system using mediated service logic enables telecommunications services to be provided in a first telecommunications network, even though the service logic for the telecommunications service resides in a second telecommunications network. A first service control point (SCP), located in the first telecommunications network, has a plurality of service logic modules, including a first mediated service logic module, and a second SCP, located in the second telecommunications network has a plurality of service logic modules, including a second mediated service logic module. When a service switching point (SSP) in the first telecommunications network determines that intelligent network services are required to process the call, it transmits a query message to the first SCP. The first SCP consults the relevant customer's service profile to determine which service logic module to execute to provide the requested service, and the first SCP then executes this service logic module. If the first mediated service logic module is thereby executed, then it transmits an internetwork query message to the second SCP to invoke the service logic needed to provide the service. The second mediated service logic module in the second SCP receives the internetwork query message, executes the necessary service logic module, and transmits to the first SCP an internetwork response message containing the information needed to provide the service.

47 Claims, 8 Drawing Sheets

U.S. PATENT DOCUMENTS

| | | | | |
|---|---|---|---|---|
| 5,610,972 A | | 3/1997 | Emery | 455/414 |
| 5,664,005 A | | 9/1997 | Emery | 455/422 |
| 5,664,102 A | | 9/1997 | Faynberg | 709/246 |
| 5,701,301 A | | 12/1997 | Welsser | 370/428 |
| 5,758,281 A | | 5/1998 | Emery | 455/428 |
| 5,835,583 A | * | 11/1998 | Hetz et al. | 379/219 |
| 5,862,334 A | | 1/1999 | Schwartz | 709/223 |
| 5,883,950 A | | 3/1999 | Sonnenberg | 379/24.13 |
| 5,890,064 A | | 3/1999 | Widergren | 455/445 |
| 5,915,008 A | | 6/1999 | Dulman | 379/221.08 |
| 5,953,404 A | | 9/1999 | Fikis | 379/230 |
| 5,963,630 A | | 10/1999 | Dabbs | 379/201.01 |
| 6,185,289 B1 | * | 2/2001 | Hetz et al. | 379/207.11 |

OTHER PUBLICATIONS

International Engineering Consortium, *The 1999 Intelligent Network Comprehensive Report*, pp. 121–138, 161–180, 189–198, 211–217.

"An Intelligent Network Platform: The Advanced Intelligent Network," *Froehlich/Kent Encyclopedia of Telecommunications*, vol. 9, pp 259–280 (1995).

"Access Mediation," http://www.webproforum.com/acc_med/ (Jun. 17, 1999).

Notice of Proposed Rulemaking, *In the Matter of Intelligent Networks*, 8 FCC Red No. 19, pp. 6813–6827 (1993).

* cited by examiner

METHOD AND SYSTEM FOR PROVIDING TELECOMMUNICATIONS SERVICES USING MEDIATED SERVICE LOGIC

BACKGROUND OF THE INVENTION

1. Field of the Invention

The present invention relates in general to telecommunications networks and more particularly to methods and systems for using a mediated service logic to provide telecommunications services.

2. Description of Related Art

Recent advances in telecommunications technology have allowed a wide array of special telecommunication services to be made available to subscribers. Examples of such services include abbreviated dialing, which allows a subscriber to reach a party by dialing less than the entire telephone number of that party, call forwarding, in which calls directed to the subscriber may be forwarded to another line, terminating call screening, which allows the subscriber to specify certain times during which incoming calls are to be rejected, and originating call screening, in which calls to certain telephone numbers are barred. In general, special telecommunications services ("services") encompass those call features that do more than simply place or terminate telephone calls as dialed.

To enable such services, telecommunications networks typically carry "signals," as well as the voice or data comprising the conversation between the calling party and the called party. These signals monitor the status of the lines, indicate the arrival of incoming calls, and carry the information needed to route the voice or other data through the network. At one time, these signals were inband, i.e., the signals were transmitted through the same circuits as used for voice transmission. However, most telecommunications networks now use out-of-band signaling, i.e., the signals are transmitted over a signaling network separate from the circuit-switched network that carries voice and data. Thus, signals carried on the separate signaling network are used to control the switches in the circuit-switched network to set up and tear down the circuit between the calling party and called party. Currently, Signaling System 7 ("SS7")is the most commonly used signaling'system.

In previous decades, the switches themselves provided the special telecommunications services. However, the switches had to have a great deal of "intelligence" built into them to accomplish this. In particular, a typical switch included a database of control information and call processing logic, in addition to switching capabilities. This approach was unwieldy because a telecommunications provider needed to update the software and databases on all of its many switches in order to update services or add new services throughout its telecommunications network. To complicate matters, the software needed to program switches from different vendors often differed greatly.

To overcome these limitations, most telecommunications networks in the Unites States have adopted the advanced intelligent network ("AIN") approach. The advent of AIN has improved matters in two ways. First, most of the control information and call processing logic resides in a central network location, the service control point ("SCP"), instead of in the multitude of switches. Second, AIN provides a set of standardized messages between the switches and the SCP to allow for a variety of services. These standards are embodied in Bellcore's AIN Release 0.1 and AIN Release 0.2.

The benefit of having the call control functions in a centralized SCP is that changes made at the SCP will apply to a large number of switches. This makes changing services and adding new services much easier and reduces the problem of differences in switches from different vendors. Moreover, the centralization at the SCP and the standardized message set allows an SCP to control a large number of switches, which are referred to as service switching points ("SSPs") in AIN parlance, even those from different vendors. Indeed, in the AIN approach, the switches can be quite generic but still able to provide a variety of services. This is because, instead of the SSPs themselves having the necessary call processing logic, the SSPs signal the SCP for guidance at predefined "trigger points" in the call processing. The signal from the SSP passes a set of relevant parameters, in a predefined format, to the SCP. Such parameters can include the calling party's telephone number and the called party's telephone number, for example. In SS7, this signal is coded as a Transaction Capabilities Application Part ("TCAP") query message. When the SCP receives the TCAP query, it executes the appropriate service logic and consults the appropriate databases to obtain the information and instructions needed to provide the intelligent network service. The SCP then sends a message, typically a TCAP response message, to the SSP instructing it how to complete the call to provide the service.

Because of the large number of SSPs and other network elements connected to the signaling network, the signaling network typically includes one or more signal transfer points ("STPs") that route the signals through the signaling network. Thus, the signals between SSPs and other SSPs or the SCP are often routed through one or more STPs.

An illustrative part of a typical AIN network 10 is shown in FIG. 1. In FIG. 1, the circuit-switched pathways that carry voice and data are represented by solid lines, and signaling pathways and other logical connections are represented by dashed lines. In network 10, a first station 12 is connected to the public switched telephone network ("PSTN") 14 via a first SSP 16, and a second station 18 is connected to PSTN 14 via a second SSP 20. Stations 12 and 18 may be telephones, fax machines, modems, or other such devices. SSPs 16 and 20 are connected to each other and to an SCP 22 by a signaling network that includes a first STP 24 and a second STP 26. SCP 22 is provided with a service management system ("SMS") 28 that allows for the provision and modification of the information and service logic residing in SCP 22. SMS 28 typically includes a user interface, the service creation environment ("SCE") 30, which may be accessed by a computer terminal 32. In this way, a user at terminal 32 is able to access, create, and modify the service logic and other information in SMS 28 and then download it to SCP 22.

As a simple illustration of the operation of network 10, consider the case where the user of station 12 subscribes to an abbreviated dialing service. To call station 18, the user of station 12 dials less than the complete telephone number of station 18. The collection of the abbreviated telephone number by SSP 16 serves as a trigger point indicating a need for AIN services. SSP 16 thus sends a TCAP query, which includes the dialed digits and the number of calling station 12 as parameters, to SCP 22 via STP 24. The service logic of SCP 22 first verifies that the customer corresponding to station 12 subscribes to the abbreviated dialing service. SCP 22 then retrieves the complete telephone number of station 18 and passes it as a parameter in a TCAP response message to SSP 16. From this information, SSP 16 is able to signal to SSP 20, via STPs 24 and 26, to attempt to set up a circuit-switched voice path from station 12 to station 18 through PSTN 14.

Note that AIN services can also be invoked when an SSP attempts to complete a call, such as when SSP 16 attempts to complete a call from station 18 to station 12. An example is when the user of station 12 subscribes to a terminating call screening service. In this case, when SSP 16 receives a termination attempt, i.e., an attempt to complete a call from station 18 to station 12, it sends a TCAP query to SCP 22 containing the telephone number of station 12 as a parameter. SCP 22 determines that calling station 12 subscribes to a terminating call screening service and, based on the time of day or other circumstances, determines whether or not the call should be allowed to go through to station 12. SCP 22 then sends a TCAP response message to SSP 16 with appropriate parameters to indicate the required call disposition, i.e., whether or not to connect the call to station 12.

In the AIN approach, there is typically only one SCP that an SSP sends queries to and receives responses from. However, although only a single SCP 22 is shown in FIG. 1, one SCP typically controls many. SSPs, with each SSP typically being connected to thousands of stations. Thus, each SCP defines a telecommunications network.

Typically, each telecommunications network defined by an SCP and the SSPs it controls will be operated by one telecommunications service provider, the local exchange carrier ("LEC"). Thus, in FIG. 1, SSP 16 is designated a LEC SSP, SCP 22 is designated a LEC SCP, and STP 24 is designated a LEC STP. In contrast, SSP 20 and STP 26, could be part of a different LEC's network, i.e., SSP 20 could signal to an SCP other than LEC SCP 22.

Of course, calls from a station in one LEC's network can be connected through another LEC's network. Additionally, AIN services can be provided to a station connected to a LEC's SSP, even with respect to calls originating from or going to SSPs that are not the LEC's. However, two fundamental limitations to the AIN approach remain. First, because a station is typically connected to only a single SSP, i.e., the LEC's SSP, which typically signals only a single SCP, i.e., the LEC's SCP, it is very difficult for other companies, i.e., alternative service providers ("ASPs"), to compete with the LEC for the sale of telecommunications services to the owner of that station. This problem is described herein as the "competition limitation."

The second limitation arises because of the multiplicity of SCPs. AIN services provided by a given SCP are typically available only to subscribers connected to SSPs controlled by that SCP (or controlled by other SCPs owned by the same LEC, which SCPs may have the same service logic and the same information databases). Certain exceptions exist, however, such as toll free calling and credit card calling. This is because the information needed to process the call resides in a centralized database that SCPs from different LECs can access. Other services, such as abbreviated dialing and terminating call screening, are typically unavailable to a subscriber if he operates outside of his home LEC's network. This problem has become particular acute with the recent popularity of wireless telephones, such as cellular and PCS telephones. Because the wireless network is typically controlled separately from the wireline network, a subscriber's wireline services may be unavailable when he uses his wireless telephone, and vice versa. This problem is described herein as the "internetwork limitation."

The United States Federal Communications Commission ("FCC") has begun to address the competition limitation. In 1993, the FCC released a Notice of Proposed Rulemaking ("NPRM") that discussed ways LECs could make available "mediated access" to their intelligent networks to third parties. See In the Matter of Intelligent Networks, CC Docket No. 91-346, Notice of Proposed Rulemaking, 8 FCC Rcd 6813 (1993). In the NPRM, "access" was defined as the ability of third parties to communicate with a LEC network to use the intelligent network capabilities. This access was to be "mediated access," in that the third party's access was to be limited to prevent activity that might compromise network reliability. The NPRM discussed three phases of mediated access to intelligent networks: (1) mediated access at the SMS; (2) mediated access at the SCP; and (3) mediated access at the switch.

In the first phase, third parties would be allowed access to the LEC's SMS to create new services based on LEC-specified parameters. Access to the SMS could be through the SCE. With reference to FIG. 1, a LEC could make computer terminal 32 available to third parties so that they can access SMS 28 via SCE 30. Alternatively, a LEC could allow the third party's own computer terminal (not shown) to connect to SCE 30. The service logic created by the third party could be tested in the SMS and then downloaded from the SMS to the SCP. Alternatively, the service logic could be tested in an off-line SMS connected to an off-line SCP before being transferred to the on-line SMS for downloading to the on-line SCP. Once in place in the SCP, the service logic would interact with the LEC's SSPs to provide the third party's services to stations connected to the LEC's network.

In this approach, mediation would occur in three ways. First, because the LEC would be providing the parameters from which services could be built, the possibility that the new service would conflict with existing services would be minimized. Second, before the service logic would be downloaded to the SCP it would be extensively tested and validated. Third, the SCP could mediate in real time to make sure that incorrect or undesirable instructions are not sent to the network as a result of the third party's services. For example, a LEC may wish to block a third party's call forwarding service that attempted to forward a call to an unauthorized number.

This first phase of mediated access is what the FCC proposed to require in its NPRM. Moreover, a subsequent FCC order required this type of mediated access. See In the Matter of the Local Competition Provisions in the Telecommunications Act of 1996, CC Docket No. 96–98, First Report and Order (1996).

The first phase of mediated access does provide ASPs, the alternative service providers, with opportunities to compete with the LECs that would otherwise be unavailable. However, significant drawbacks with this approach exist. Specifically, because the ASP's service logic would be created in and reside entirely on the LEC's systems, it would be fully visible to the LEC. Thus, the LEC could quickly match whatever innovative services an ASP might provide through its mediated access. This stands as a significant competitive disadvantage to any ASP. Additionally, an ASP would need to rely on the LEC system to create the billing records needed for the ASP to bill for its services. This stands as another competitive disadvantage for an ASP. Finally, this phase does little to address the internetworking limitation.

The second phase proposed by the FCC in its NPRM, described as mediated access at the SCP, would provide better access for ASPs and would allow for internetworking. An integrated network 50 illustrating this approach is shown schematically in FIG. 2. Phase two assumes that the ASP has its own SCP 52. Typically, the ASP would be able to use its own SMS 54, SCE 56, and computer terminal 58, to create and modify service logic on its own SCP 52 to define telecommunications services. The ASP would then be able to provide these telecommunications services to stations connected to the LEC's network by connecting ASP SCP 52 to the LEC's network. Specifically, ASP SCP 52 would have access to LEC SSP 16, and, thus, station 12, via a LEC "Gateway" SCP 60, which would perform a majority of the mediation.

A similar approach has been suggested by Amdahl, in which a "mediation point" takes the place of the "Gateway SCP." See Web ProForum Tutorial: Access Mediation, http://www.webproforum.com/acc$_{13}$ med. This approach is described in detail with reference to FIG. 2. When LEC SSP 16 detects an AIN trigger, it launches a query to. LEC STP 24 via non-final global title translation ("GTT"). Based on GTT, LEC STP 24 forwards the query to the LEC's mediation point 60. Mediation point 60 performs mediation functionality on the query and forwards it to ASP SCP 52 via LEC STP 24 and STP 26. Upon receipt of the query, ASP SCP 52 then performs AIN functionality and sends its own message to provide the desired AIN service. LEC STP 24 forwards this message to mediation point 60, which performs additional mediation and forwards the message to LEC SSP 16 via LEC STP 24.

Another similar approach is disclosed in U.S. Pat. No. 5,915,008. An integrated service control point (ISCP) provides AIN routing control functionalities to customers of the LEC and also serves as a "mediation point" by mediating queries and responses between the LEC network and databases operated by other carriers. For example, when the ISCP receives a TCAP query from an SSP, via an STP, the ISCP communicates with another carrier's SCP through the SS7 network, if the conditions relating to the call meet certain criteria. The other carrier's SCP then determines how to process the particular call and returns an appropriate instruction, in a TCAP response message, to the ISCP. The ISCP performs a mediation function by processing the instructions from the other carrier's SCP to insure validity and compatibility with the LEC network. Based on validated instructions, the ISCP then formulates an appropriate TCAP response message and transmits it to the SSP via one or more STPs.

The FCC has not yet required the second phase of mediated access. However, even if it did, significant disadvantages with this approach exist. First, an additional, and potentially costly, network element may be required, i.e., either a "gateway SCP" or "mediation point." Second, some criteria would need to be established to determine whether a query from an SSP should be processed by the LEC SCP or by an ASP SCP. One criterion could be the calling party or called party ID, i.e., the identity of the subscriber. However, this criterion is too limiting, because it does not take into account the possibility that a subscriber may buy some of its telecommunications services from the LEC and others from an ASP. Thus, the identity of the subscriber alone may not be sufficient to specify how queries should be routed.

The third phase proposed by the FCC is mediated access at the switch. In this phase, at predefined triggers, the LEC SSP would signal the ASP SCP directly, i.e., without the intervention of a "gateway SCIP." Although this approach provides the most direct access, it also has several disadvantages. First, the switch itself would need to perform the mediation. Second, third party service development would appear to require updates to the software in each switch to ensure continued network reliability. Thus, this approach would require a step backward in the development of telecommunications networks that would tend to reduce the benefits of the AIN architecture. In any event, the FCC has not yet required this kind of mediated access.

An illustrative integrated network 70 using this type of mediated access is shown in FIG. 3. Notably, in network 70, SSP 16 is replaced by an "intelligent" SSP 72, to reflect the more complicated software that would need to be resident at the SSP. In particular, "intelligent" SSP 72 must now determine at each trigger point whether to send a query message to LEC SCP 22 or to ASP SCP 52. The possibility that different programming may be required for switches from different vendors creates a difficulty in adding this capability to a multitude of switches. Moreover, the disadvantages become more apparent as more than one ASP desires access to "intelligent" SSP 72, because even more "intelligence" would need to be added.

SUMMARY OF THE INVENTION

In a first principal aspect, a method is provided for providing telecommunications services in a first telecommunications network, in which a call connection system establishes a communication pathway through said first telecommunications network in response to messages from a first network controller. The first network controllers has a plurality of service logic modules, including a mediated service logic module and a plurality of non-mediated service logic modules. The first network controller receives a query message from the call connection system and determines the relevant customer and what service is being implicated from the parameters included in the query message. The first network controller also obtains a service profile for the relevant customer that identifies a predetermined service logic module to execute to provide the implicated service. If the predetermined service logic module is a non-mediated service logic module, then the first network controller executes it to define a set of output parameters, formulates a first response message from the output parameters, and transmits it to the call connection system. If, however, the predetermined service logic module is the mediated service logic module, then the first network controller executes it to formulate an internetwork query. The mediate service logic module transmits the internetwork query to a second network controller in a second telecommunications network and then receives an internetwork response message from the second network controller, which message contains a second set of parameters. The first network controller formulates a response message from the second set of parameters and transmits it to the call connection system.

In a second principal aspect, a system is provided for communicating with a second network controller in a second telecommunications network to provide telecommunications services in a first telecommunications network. The system comprises a first network controller in the first telecommunications network a call connection system in the first telecommunications network, a plurality of service logic modules disposed in the first network controller, a database of service profiles disposed in the first network controller, and a base service logic module disposed in the first network controller. The call connection system sends query messages containing a first set of parameters to a first network controller for requesting call processing instructions and establishes a communication pathway through the first telecommunications network in response to response messages from the first network controller. The service logic modules include a mediated service logic module and a plurality of non-mediated service logic modules. Each one of the service profiles in the database is associated with a particular customer and identifies which service logic module to execute to provide each service available to that particular customer. The first mediated service logic module is able, when executed, to transmit an internetwork query message to a second network controller in a second network and to receive an internetwork response message from the second network controller. The base service logic module determines the relevant customer and what service is implicated from the first set of parameters and consults the database to identify the service logic module to execute to provide the implicated service. The base service logic module executes this service logic module and obtains a first output, if the service logic module is a non-mediated service logic module, and obtains a second output, if the service logic module is the mediated service logic module.

In a third principal aspect, a method is provided for providing an additional telecommunications service in a first telecommunication network in which telecommunications services arc provided by a first network controller. A first mediated service logic module is added to the first network controller. The first mediated service logic module is able, when executed, to transmit an internetwork query message to a second network controller in a second network and to receive an internetwork response message from the second network controller. The database of customer service profiles in the first network controller is updated to indicate that the mediated service logic module is to be executed when the additional telecommunications service is implicated.

By using a mediated service logic module in a first network controller in a first network, which mediated service logic module communicates with a second network controller in a second network, services can be provided in the first network using service logic in the second network controller. This enhances the ability of an ASP, operating the second network controller, to compete with a LEC, operating the first network controller, for the sale of services to customers using the first network. Thus, the mediated service logic approach addresses the competition limitation described above.

Additionally, by providing a mediated service logic module in the second network controller as well, services can be provided in the second network using service logic in the first network. Thus, the mediated service logic approach also addresses the internetworking limitation.

These as well as other advantages of the present invention will become apparent to those of ordinary skill in the art by reading the following detailed description, with appropriate reference to the accompanying drawings.

DETAILED DESCRIPTION OF AN EXEMPLARY EMBODIMENT

Figure 1:
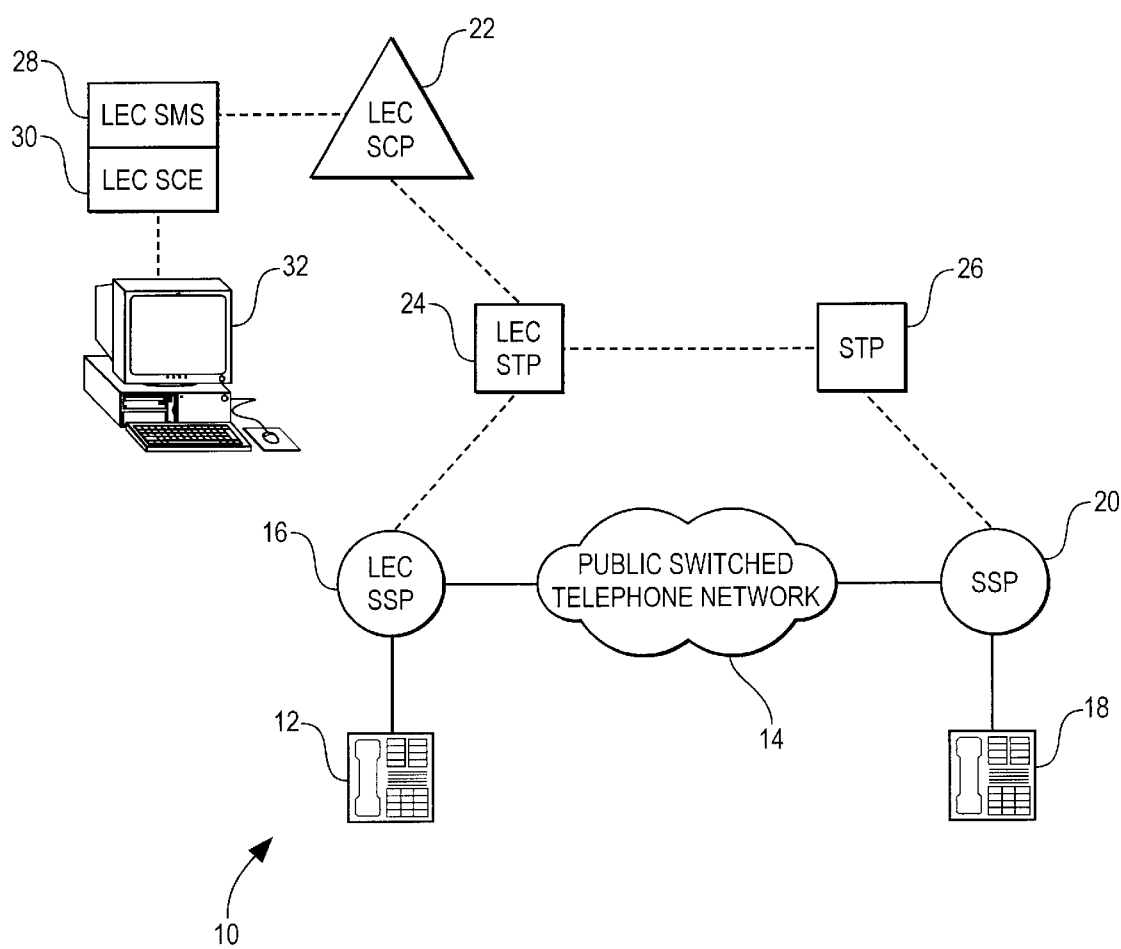
FIG. 1 is a block diagram illustrating an exemplary telecommunications network using the AIN architecture.
Figure 2:
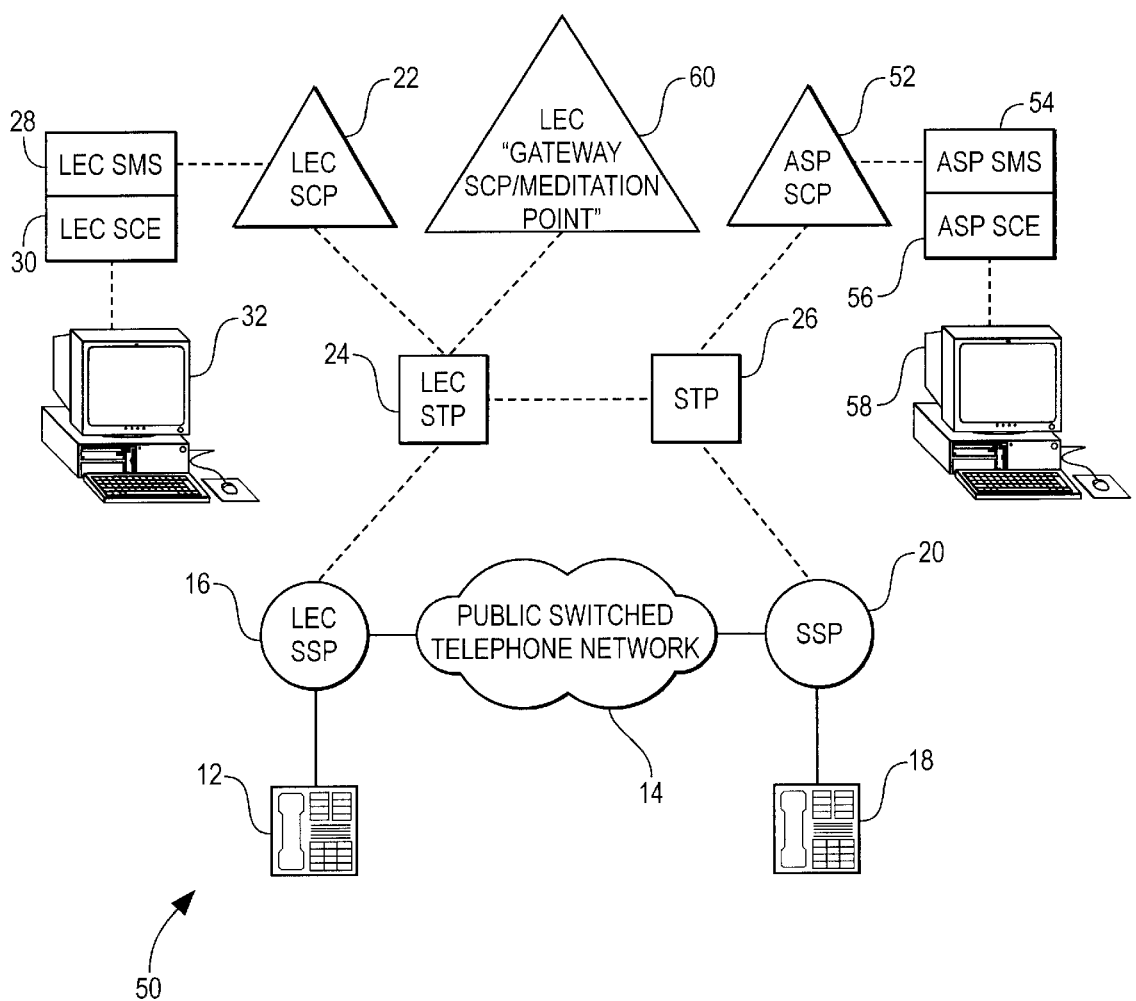
FIG. 2 is a block diagram illustrating an exemplary telecommunications network in accordance with phase two of the FCC's mediated access proposal.
Figure 3:
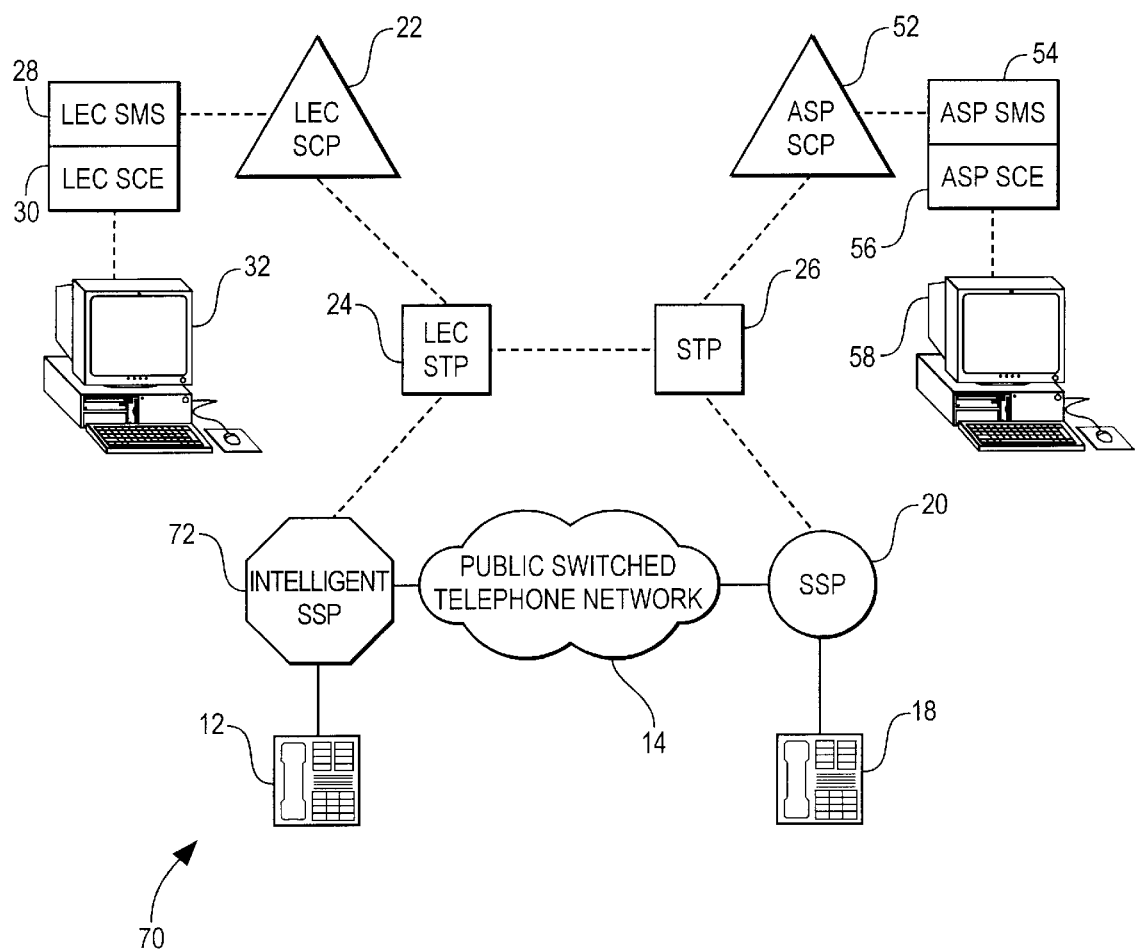
FIG. 3 is a block diagram illustrating an exemplary telecommunications network in accordance with phase three of the FCC's mediated access proposal.
Figure 4:
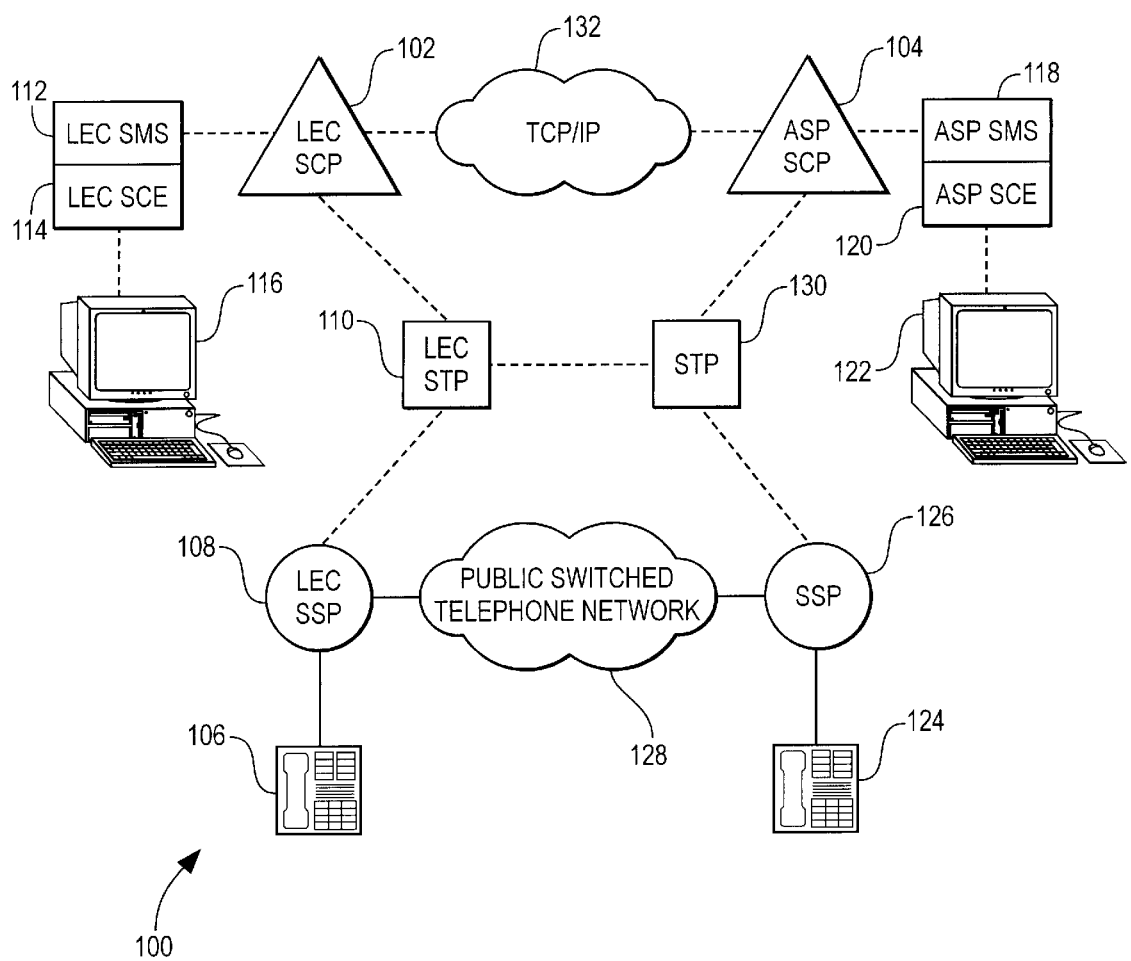
FIG. 4 is a block diagram illustrating an exemplary telecommunications network in accordance with an exemplary embodiment of the present invention.

FIG. 4 illustrates a functional block diagram of an exemplary telecommunications network 100 in which the mediated service logic of the present invention allows for communication between a LEC SCP 102 and an ASP SCP 104. In FIG. 4, logical connections and signaling pathways are represented by dashed lines, and circuit-switched connections for voice and data are represented by solid lines. A first station 106 is connected to a LEC SSP 108, which is connected to LEC SCP 102 via a LEC STP 110. Station 106 may be a telephone, fax machine, modem, or other such device. LEC SCP 102 includes a LEC SMS 112 for the creation, modification, and testing of services. Typically, LEC SMS 112 is provided with a user interface, LEC SCE 114, which is accessed by computer terminal 116. ASP SCP 104 also typically includes an ASP SMS 118, and an ASP SCE 120, accessible by a computer terminal 122. Also shown in FIG. 4 is a second station 124 connected to an SSP 126. SSP 126 is outside of the LEC's network, but is accessible by LEC SSP 108 through the PSTN 128. SSP 126 is also accessible by LEC SSP 108 though the signaling network, namely, via LEC STP 110 and a second STP 130. LEC SCP 102 and ASP SCP 104 are also interconnected through the signaling network via LEC STP 110 and STP 130. Preferably, a wide area network 132 running TCP/IP also interconnects LEC SCP 102 and ASP SCP 104.

Figure 5:
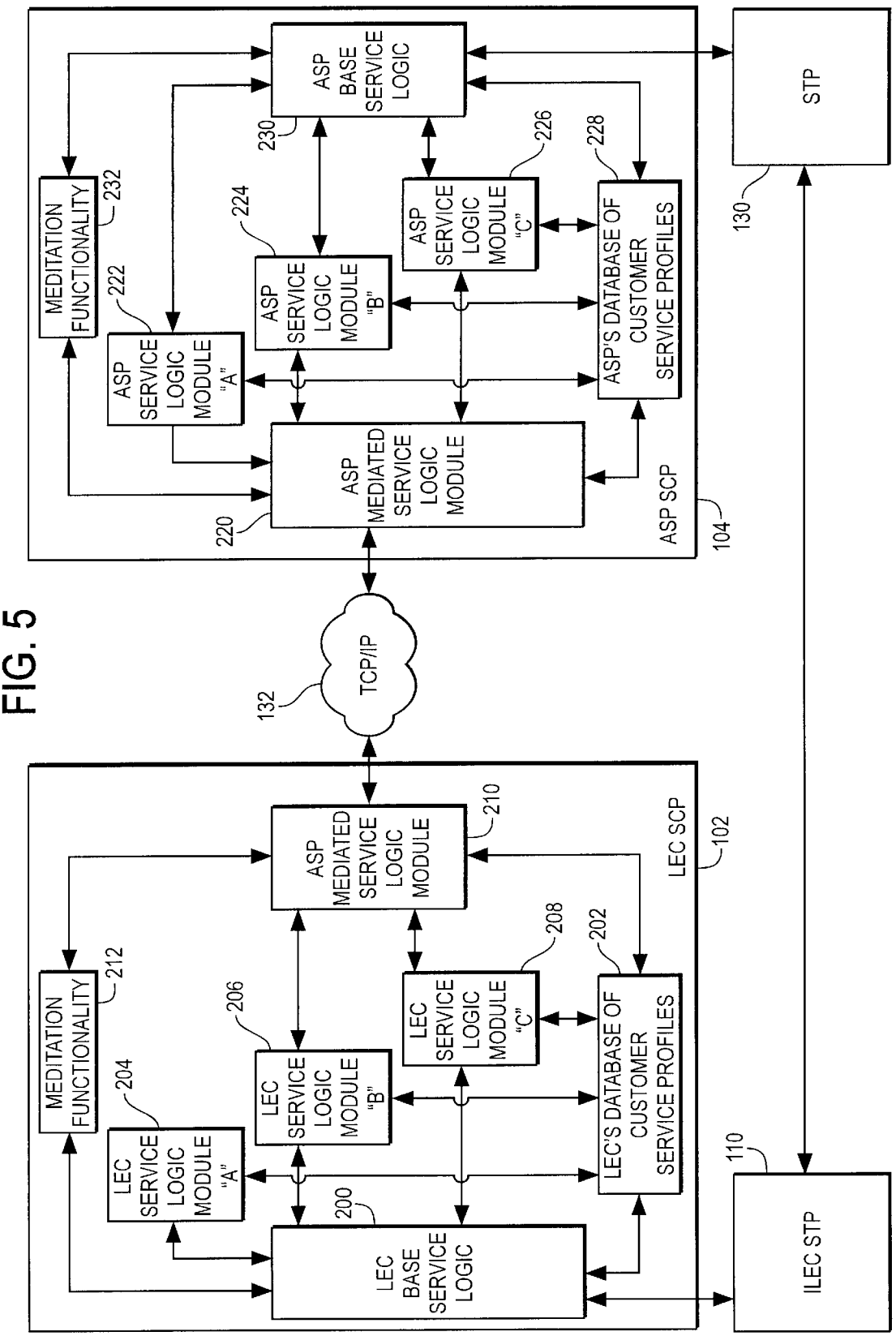
FIG. 5 is a block diagram providing a more detailed illustration some of the components illustrated in the block diagram of FIG. 4, in accordance with an exemplary embodiment of the present invention.

A more detailed look at the functional components of LEC SCP 102 and ASP SCP 104 is provided by FIG. 5. In FIG. 5, double-headed arrows indicate the most important logical connections between the components. LEC SCP 102 includes a base service logic module 200. Base service logic module 200 includes functionality for decoding and encoding TCAP messages received from and sent to LEC SSP 108 via LEC STP 110. Base service logic module 200 also includes service logic for determining what databases and service logic modules to invoke to process the information from the decoded TCAP messages. For example, base service logic module 200 has access to a database 202 containing the service profiles of the LEC's subscribers. In particular, each customer in the LEC's network has a service profile that identifies: (1) the customer by telephone number; (2) what services the customer subscribes to; and (3) what service logic module to run for each service.

The service profile may also include certain service parameters specifying the operation of one or more of the customer's services. For example, the service profile for customer John Doe might list his phone number as 765-4321 and indicate that he subscribes to a terminating call screening feature. The service parameters for this service may include the days and times the call screening is to be in effect, e.g., just evening hours. The service parameters may also indicate that, even when the call screening is in effect, calls from certain telephone numbers, e.g., close friends and relatives, can get through. As another example, if John Doe subscribed to an abbreviated dialing service, his service profile might specify that the sequence of dialed digits "1-2-3-4" stands for the telephone number 987-567-1234.

Typically, associated with each AIN service is a service logic module, which is the software specifying how to provide the service. Shown in LEC SCP 102 are the service logic modules 204–208 for three representative AIN services "A," "B," and "C." Although three service logic modules are shown in FIG. 5 for purposes of illustration, it is to be understood that LEC SCP 102 can include a greater or lesser number. To provide a given AIN service, base service logic module 200 typically invokes the appropriate one of modules 204–208 as a kind of subroutine call. In particular, base service logic module 200 passes a set of input parameters to the service logic module, and the module returns a set of output parameters out of which base service logic module 200 can encode the TCAP message or messages needed to provide the desired service. For example, if service logic module 204 defines a terminating call screening service, it would typically compare the current time of day and calling party's telephone number to the customer's call screening parameters to determine whether the call should be completed or not. In the case where the call is not to be completed, service logic module 204 may also specify how to connect the calling party to an intelligent peripheral ("IP") so that the IP can play a recorded message explaining the called party's unavailability. As shown in FIG. 5, service logic modules 204–208 are typically able to query database 202 directly, and, although it is not shown in FIG. 5, it is possible for service logic modules 204–208 to invoke each other.

In accordance with the present invention, a mediated service logic module 210 is also resident in LEC SCP 102. Mediated service logic ("MSL") module 210 is similar to service logic modules 204–208 in that it represents software that may be invoked by base service logic module 200 to provide AIN services. But MSL module 210 differs from service logic modules 204–208 in three important respects. First, whereas service logic modules 204–208 are typically created and maintained by the LEC, MSL module 210 will typically be created and maintained by a competitor of the LEC, i.e., an ASP. Second, because MSL module 210 is typically that of a competitor, the parameters it passes to base service logic module 200 may be screened by a mediation functionality 212 to prevent the provision of services that may be invalid or incompatible with the LEC's network. Alternatively, instead of providing mediation functionality 212, service logic modules created by the LEC's competitors, such as MSL module 210, may simply be extensively tested to validate their operation before being placed into service. Third, to provide AIN services, MSL module 210 invokes other service logic modules as a kind of subroutine call, i.e., it does not itself include all of the software needed to provide the desired services. In particular, MSL module 210 invokes service logic modules resident in ASP SCP 104; it does so by sending an internetwork query message to ASP SCP 104 and receiving an internetwork response message from ASP SCP 104.

With reference to FIGS. 4 and 5, an ASP will typically add MSL module 210 to LEC SCP 102 by accessing LEC SMS 28, such as through LEC SCE and computer terminal 32. ASP may also access SCE 30 through its own computer terminal 58. The ASP will also arrange to have database 202 updated to indicate which customers subscribe to the ASP's services. Specifically, the service profiles for such customers must be updated to indicate that MSL module 210 is to be executed to provide the ASP's services to which the customer subscribes.

To allow for communication with MSL module 210, ASP SCP 104 is provided with its own mediated service logic module 220, in addition to its own set of service logic modules 222–226, and its own database of customer service profiles 228. In many cases, ASP SCP 104 controls its own telecommunications network ("the ASP network"), in which case it also includes a base service logic module 230. Base service logic module 230 decodes and encodes TCAP messages received and transmitted via STP 130. Base service logic module 230 can also access database 220 and can run service logic modules 222–226 and MSL module 212.

As described below, although MSL module 210 on LEC SCP 102 is "incomplete," it is able to access, via MSL module 220 on ASP SCP 104, service logic modules 222–226 and database 228 on ASP SCP 104 so as to obtain the information and instructions needed to provide the desired AIN services on the LEC's network. Similarly, as described below, MSL module 220 on ASP SCP 104 can access, via MSL module 220 on LEC SCP 102, service logic modules 204–208 and database 202 on LEC SCP 102 in order to obtain information to provide AIN services on the ASP network. For this reason, ASP SCP 104 may also have a mediation functionality 232 screening the parameters passed to base service logic module 230, in order to prevent the provision of services that may be invalid or incompatible with the ASP's network.

MSL modules 210 and 220 preferably communicate using the TCP/IP protocol over a wide area network 132. Alternatively, MSL modules 210 and 220 can communicate using SS7 over the signaling network, i.e., via STP 110 and STP 130.

Figure 6:
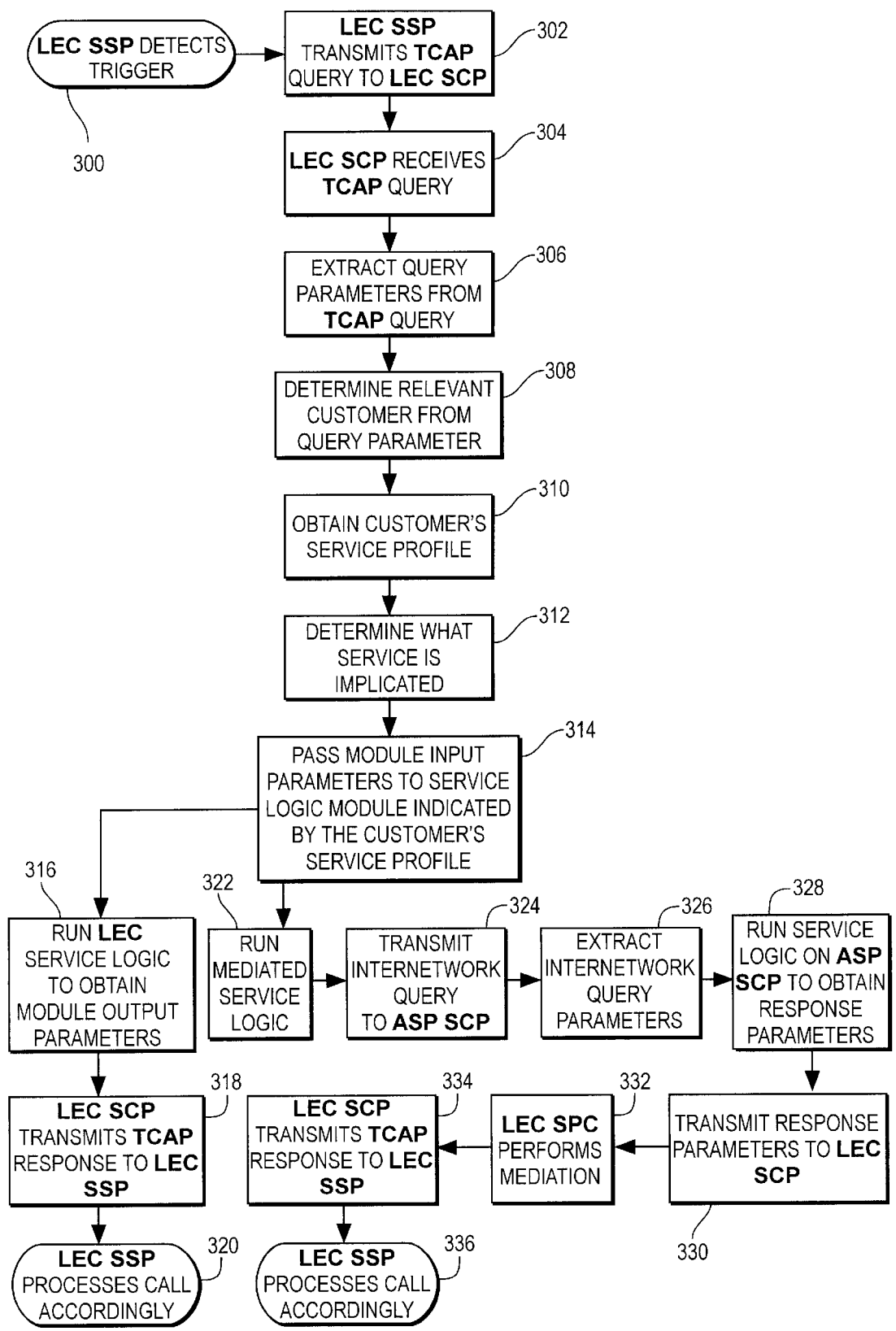
FIG. 6 is a flow chart illustrating an exemplary series of steps, in accordance with an exemplary embodiment of the present invention.

FIG. 6 shows how MSL modules 210 and 220 can work together to provide AIN services to station 106 connected to LEC SSP 108. The processing of this AIN service begins at step 300 when LEC SSP 108 detects a predetermined trigger during the course of processing a call. Such triggers can occur when station 106 attempts to originate a call. For example, AIN 0.1 supports an "Origination Attempt" trigger detection point that is triggered as soon as the station connected to the switch goes off-hook. Another example is the "Information Collected" trigger detection point, supported by AIN 0.1, which is triggered by an off-hook delay. Such triggers can also occur when an attempt is made to terminate a call to station 106. For example, AIN 0.1 supports a "Termination Attempt" trigger detection point.

When SSP 108 detects such a trigger, it typically suspends the call and sends a message to LEC SCP 102 for instructions on how to process the call. In the typical case where SS7 is used as the signaling system the message sent by LEC SSP 108 is preferably a TCAP query that is forwarded to LEC SCP 102 via LEC STP 110. This is shown as step 302 in FIG. 6. Other signaling systems could also be used, in which case the message would take some other form and routing would occur by some other means. In any event, the message sent by LEC SSP 108 will typically include one or more query parameters needed to identify the relevant customer and to provide the AIN service. Such query parameters can include the calling party's telephone number, the called party's telephone number, and the dialed digits.

LEC SCP 102 receives the TCAP query in step 304. In step 306, LEC SCP 102 decodes the TCAP query and extracts the.query parameters. Typically, base service logic 200 is the functional entity that performs this step. Next, in step 308, LEC SCP 102 determines the relevant customer from the query parameters. Typically, if SSP 108 detected the trigger during the course of station 106 originating the call, the calling party's number, i.e., the telephone number of station 106, will identify the relevant customer. If the trigger was detected during an attempt to terminate the call to station 106, the called party's number, again the telephone number of station 106, will typically identify the relevant customer.

In step 310, LEC SCP 102 obtains the service profile for the relevant customer. Typically, this step is accomplished by base service logic 200 passing the parameters needed to identify the relevant customer to database 202. In step 312, base service logic 200 determines from the information contained in the customer's service profile what service is implicated and what service logic module to run for that service. Base service logic 200 then passes a set of module input parameters to that service logic module in step 314. Typically, these module input parameters will be a subset of the query parameters passed to LEC SCP 102 in the TCAP query.

The next step is running the appropriate service logic module. At this point, the processes performed will depend on whether the service logic module being executed is one of the LEC's service logic modules 204–208, i.e., a non-mediated service logic module, or the ASP's mediated service logic module 210. If one of the LEC service logic modules 204–208 is invoked, then, in step 316, the service logic module simply returns a set of module output parameters to base service logic 200. Then, in step 318, LEC SCP 102 transmits a TCAP response message to LEC SSP 108. Typically, the TCAP response message will include one or more response parameters that serve to instruct the SSP on how to process the call. These response parameters will typically be based on the output parameters provided by the service logic module. For example, if abbreviated dialing is the service being invoked, the response parameters will typically include the full telephone number of the called party. Depending on how the abbreviated dialing service is structured, the response parameters may also provide SSP 108 with a preferred route to reach the called party. In the case of a terminating call screening service being invoked, the response parameters will typically instruct SSP 108 whether or not it should complete the call to station 106. If the call is to be screened, the response parameters may also instruct SSP 108 to connect the caller to an IP (not shown) to play a recorded-message or to allow further interaction with the caller, such as to allow connection to the called party's voice mail. In any event, as shown in step 320, SSP 108 processes the call as instructed by the TCAP response message.

If MSL module 210 is invoked, as shown in step 322, the process is more complicated. In step 324, MSL module 210 causes LEC SCP 102 to transmit an internetwork query message to ASP SCP 104. The internetwork query message is preferably transported over wide area network 132 using the TCP/IP protocol. Alternatively, the internetwork query message may be transported over the signaling network, i.e., via STP 110 and STP 130, as an SS7 message. The internetwork query message will typically transmit a set of internetwork query parameters that serve to identify the service being requested and to provide the information needed to process the service.

In step 326, MSL module 220 receives the internetwork query message and extracts the internetwork query parameters. From these parameters, MSL module 220 passes a set of input parameters to the appropriate one of service logic modules 222–226 for processing the service. MSL module 220 may also consult database 228 in this step. The appropriate service logic module is run in step 328, and it returns one or more output parameters that will provide the basis for instructing LEC SSP 108, how to provide the service. In step 328, the service logic module may, if necessary, invoke another one of service logic modules 222–226, and it may also query database 228.

In step 330, MSL module 220 formulates and transmits an internetwork response message to LEC SCP 102, where it is received by MSL module 210. The internetwork response message includes one or more parameters derived from the output parameters provided by the service logic module.

A number of different messaging, formats could be used for the inter-SCP messages, i.e., the internetwork query message of step 324 and the internetwork response message of step 330. The most preferred approach is to use a message format designed specifically for such inter-SCP messages. However, existing SCPs do not support such a message format, nor is any standardized messaging methodology specifically designed for such inter-SCP messages even known to exist. Nonetheless, a number of standard messaging options currently supported by many SCPs can be used for the inter-SCP messages. In general, such standard message formats include a standard set of parameters intended for operations other than the aforementioned inter-SCP messages. However, the mediated service logic can map the required internetwork query parameters and internetwork response parameters to this standard parameter set so as to be able to use the supported message options. Thus, the details of how the internetwork query parameters and internetwork response parameters are transmitted will depend on the particular messaging option used.

If the TCP/IP protocol is used, as is preferred, then the preferred messaging option is Bellcore's ISCP Generic Data Interface Specification for TCP/IP, Version 5.0, Special Report SR-3389, Issue 2, January 1997 ("SR-3389"), which is fully incorporated herein by reference. The SR-3389 interface is often used for calls from an SCP to a line information database ("LIDB"). However, the SR-3389 messaging structure can also be used to pass parameters between SCPs, as described herein. A number of different message sets within SR-3389 can be used for the inter-SCP messages. One approach is for LEC SCP 102 to transmit the internetwork query message to ASP SCP 104 as an "InvokeApp" request message. In particular, the "InvokeApp" request message includes an "appName" parameter to identify the service logic module to be invoked in ASP SCP 104 and can also include an "InvokeAppReq" parameter within which to place parameters to be passed to the service logic module. ASP SCP 104 would then transmit the internetwork response message to LEC SCP 102 as an "InvokeApp" response message. The "InvokeApp" response message can include an "InvokeAppResp" parameter within which to place the internetwork response parameters.

Another approach is to use the "SendData" and "GetData" message sets of SR-3389. The "SendData" message set is intended to be used to update data element values on an external system. In the "SendData" query message, the data elements to be updated and their new values are passed in a "dataElementsUpdated" block. Thus, LEC SCP 102 can transmit the internetwork query message as a "SendData" query message, in which the internetwork query parameters are included in the "dataElementsUpdated" block. ASP SCP 104 would then send a "SendData" reply message to LEC SCP 102 as an acknowledgement. Next, ASP SCP 104 could send the internetwork response parameters in a "SendData" query message of its own. Alternatively, LEC SCP 102 could send a "GetData" query message to ASP SCP 104 to signal its availability to receive the internetwork response parameters. The "GetData" message set is intended to query an external system for data. A "GetData" query message includes a list of data elements to be retrieved, and a "GetData" response message includes a "dataElementsReturned" block with the values of the requested data elements. Thus, ASP SCP 104 can transmit the internetwork response parameters to LEC SCP 102 by placing them in the "dataElementsReturned" block of a "GetData" response message.

Another viable messaging option for TCP/IP is Bellcore's ISCP-IP Interface Specification, Version 5.0, Special Report SR-3511, Issue 2, January 1997 ("SR-3511"), which is fully incorporated herein by reference. The SR-3511 interface defines a message set for communication between an SCP and an IP. However, with LEC SCP 102 playing the role of the IP and ASP SCP 104 playing the role of the SCP, the SR-3511 message set can also be adapted for communication between the SCPs, as described herein. Specifically, LEC SCP 102 initiates the session by transmitting a "ProvideInstructions" message to ASP SCP 104. ASP SCP 104 then sends a "CallInfoToResource" message to LEC SCP 102 as an acknowledgement that it is ready to receive the internetwork query. Notably, the "CallInfoToReasource" message is intended to provide instructions to an IP, such as to play a recorded announcement or to collect digits. Accordingly, this message can include a number of parameters, including "ResourceType" and "StrParameterBlock," which are intended to indicate what actions the IP should perform, such as playing announcements or collecting digits. In this case, an IP would not be the recipient of the message and no such activity would be contemplated. Instead, MSL modules 210 and 220 can attribute different meanings to these parameters. In this way, the standard messages with their standard parameters can be used in non-standard ways, such as to indicate an acknowledgement, as described above, or to pass parameters, as described below. After receiving the "CallInfoToReasource" message, LEC SCP 102 responds with a "CallInfoFromResource" message. The "CallInfoFromResource" message can include an "IPReturnBlock" parameter, which is intended to be the means by which the IP returns the information it collected, such as dialed digits, to an SCP. In this case, the "IPReturnBlock" parameter would be used to pass the internetwork query parameters. Next, ASP SCP 104 sends a "CallInfoToResource" message to LEC SCP 102, which includes the internetwork response parameters within the "ResourceType" and "StrParameterBlock" parameters. Finally, LEC SCP 102 responds with a "ResourceClear" message to close the session.

It is also possible to use an SS7 signaling system for the inter-SCP messages. Specifically, the TIA/EIA Wireless Intelligent Network Interim Standard 771 ("IS-771") and the ANSI/TIA/EIA-41-D Cellular Radiotelecommunications Intersystems Operations ("41-D") standard provide five different message sets that may be used. These message sets are "FeatureRequest," "ServiceReqest," "InstructionRequest," "Search," and "Modify." In each case, the MSL modules would need to map the parameters.of the internetwork query messages and the internetwork response messages to the particular parameter sets provided in these messages. IS-771 and 41-D are fully incorporated herein by reference.

Yet another option is to use the Transport Adapter Layer Interface ("TALI") protocol, which provides SS7 messaging over TCP/IP. TALI is described in an Internet Engineering Task Force Internet-Draft, dated May 28, 1999, available at http://search.ietf.org/internet-drafts/draft-benedyk-sigtran-tali-00.txt, which document is fully incorporated herein by reference. Thus, TALI allows the inter-SCP messages to be formulated within the aforementioned SS7 message sets but to be transmitted over TCP/IP.

In step 332, MSL module 210 passes module output parameters to base service logic module 200, typically via a mediation functionality 212. Mediation functionality 212 performs mediation on the output parameters to verify that the instructions that the output parameters represent will be compatible with the LEC's network. Mediation functionality 212 will typically screen out any incompatible output parameters and will forward compatible output parameters to base service logic 200.

In step 334, LEC base service logic formulates a TCAP response message and transmits it to LEC SSP 108. The TCAP response message includes one or more response parameters, derived from the module output parameters, which serve to instruct LEC SSP 108 how to process the call. Finally, in step 336, LEC SSP 108 processes the call as instructed. In this way, and ASP is able to use service logic residing in ASP SCP 104 to provide AIN services to stations connected to the LEC's network.

By using the mediated service logic approach, an ASP may also provide AIN services to stations connected to its own network, such as station 124 connected to SSP 126, using service logic modules 204–208 and database 202 in LEC SCP 102. The process is similar to that shown in FIG. 6. Stated briefly, SSP 126 sends a TCAP query message to ASP SCP 104 via STP 130. In response, ASP base service logic 230 executes MSL module 220. MSL module 220 sends an internetwork query message to MSL module 210 in LEC SCP 102, and MSL module 210 executes one of service logic modules 204–208. MSL module 210 then sends an internetwork response message to MSL module 220, which passes the parameters to base service logic module 230. Mediation functionality 232 may screen the parameters passed to base service logic module 230. With this information, ASP SCP 104 then sends a TCAP response message to SSP 126, via STP 130, instructing SSP 126 to provide the service.

The mediated service logic approach described above provides a number of advantages to an ASP. One advantage is that the service logic modules for providing the ASP's services reside on ASP SCP 104, rather than on LEC SCP 102. Thus, the details of how the ASP provides its services on the LEC's network may be hidden from the LEC. Additionally, some of the information needed to process the services for particular customers can be put in ASP database 228, rather than in LEC database 202. This makes it even more difficult for the LEC to discern the details of the services that the ASP is providing, thus giving the ASP a competitive advantage. On the other hand, as noted above, the ASP would be able to use the service logic modules and database in the LEC network to provide AIN services to stations connected to its own network.

Another advantage of the MSL approach is that because MSL module 210 invokes other service logic modules to provide AIN services, it can be written very generically. Indeed, the main task of MSL module 210 is simply to pass parameters in a proper format. Thus, service logic modules 222–226 already written into ASP SCP 104 can support MSL modules in multiple SCPs with only minimal coding. In this way, an ASP can update services by modifying the service logic modules in one SCP and have the updated services available in a plurality of networks.

Yet another advantage of the MSL approach is that because messages are sent to and from ASP SCP 104, the ASP can beneficially monitor the services it provides to customers in the LEC network. Moreover, the ASP can generate billing records for its services on its own, without having to rely on the LEC.

Further, it is believed that the aforementioned MSL approach is enabled by the phase one mediated access ordered by the FCC. In contrast, the FCC may never require the phase two or phase three mediated access proposals discussed in the NPRM.

Figure 7:
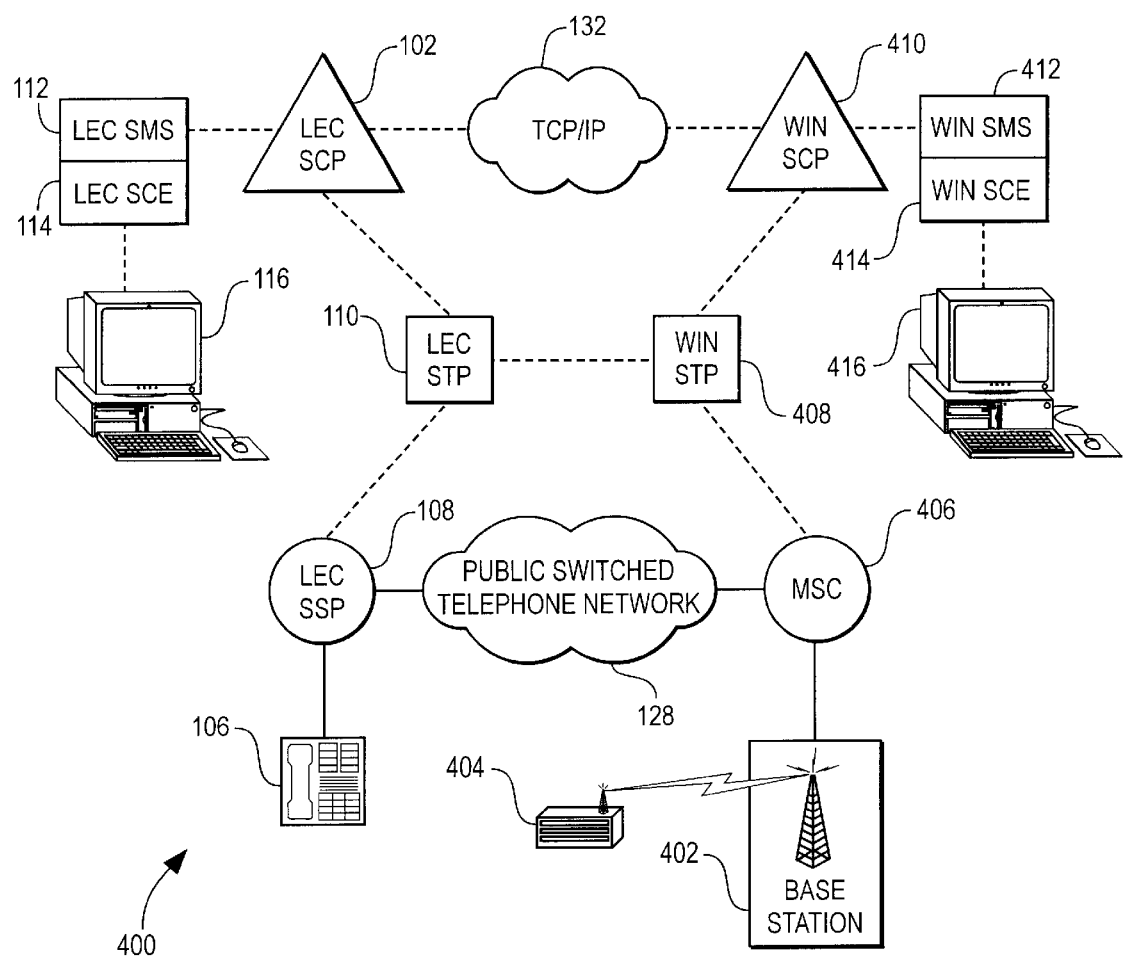
FIG. 7 is a block diagram illustrating an exemplary telecommunications network in accordance with an exemplary embodiment of the present invention.

Another advantage of the MSL approach is that it facilitates the integration of different types of telecommunications networks. For example, the MSL approach can be used to integrate wireline and wireless networks. Shown in FIG. 7 is an example of such an integrated network 400. Integrated network 400 includes a wireline network that includes a wireline station 106, LEC SSP 108, LEC STP 110, and LEC SCP 102, as discussed above. Integrated network 400 also includes components that comprise a wireless network. Preferably, the wireless network is a wireless intelligent network ("WIN"), which stands as the wireless version of the AIN approach. The current WIN standards are embodied in IS-771, which is fully incorporated herein by reference.

The wireless network includes a base station 402 that is in wireless communication with a mobile station 404. Mobile station 404 may be a wireless telephone, pager, computer, personal digital assistant ("PDA"), or other such wireless device. Mobile station 404 is typically a cellular phone using an analog standard, such as AMPS or NAMPS, a cellular phone using a digital standard, such as TDMA or CDMA, or a PCS phone. Mobile station 404 is able to send and receive information such as voice or data, such as fax, e-mail, text messages, and graphics. Although in FIG. 7 base station 402 is shown in communication with only one mobile station, base station 402 is typically able to communicate with a plurality of mobile stations.

Base station 402 is connected to a mobile switching center ("MSC") 406. MSC 406 plays a role similar to that of SSP 108 in the wireline network. MSC 406 is able to perform a switching function to create a circuit-switched path for communications between base station 402 and PSTN 128 or to other MSCs (not shown). MSC 406 is also connected to a signaling network. In particular, MSC 406 is able to send signals to and receive signals from LEC STP 110, via WIN STP 408. Such signaling typically conforms to a protocol such as SS7 or IS-41. Note that while FIG. 7 only shows one base station 402 connected to MSC 406, typically MSC 406 will be connected to a plurality of base stations.

In WIN, MSC 406 is also able to detect triggers that indicate when intelligent network services are required to process the call. When MSC 406 detects such a trigger, it transmits a query message to a WIN SCP 410, via a WIN STP 408. WIN SCP 410 is essentially the wireless network version of LEC SCP 102. Like LEC SCP 102, WIN SCP 410 typically includes a base service logic, various service logic modules, and a database of customer service profiles (not shown). A WIN SMS 412, WIN SCE 414, and computer terminal 416 are also available to allow for the creation, modification, and management of services on WIN SCP 410.

The process of providing intelligent network services in a wireless network is very similar to the AIN approach in the wireline network. Upon receiving the query message, WIN SCP 410 extracts the parameters, obtains the information required from the database of customer service profiles, and runs the necessary service logic modules. WIN SCP then creates a response message that includes a set of parameters that will instruct the MSC how to route the call and transmits the response message to MSC 406 via WIN STP 408. MSC 406 then routes the call accordingly.

The MSL approach in this case is essentially the same as in the wireline context, shown in FIGS. 4 and 5. LEC SCP 102 includes a mediated service logic module 210, and typically a mediation functionality 212, as before. WIN SCP 410 also includes a mediated service logic module (not shown), similar to MSL module 220 in ASP SCP 104. WIN SCP 410 may also include a mediation functionality (not shown), similar to mediation functionality 232 in ASP SCP 104. As before, WIN SCP 410 and LEC SCP 102 communicate over a wide area network 132 using TCP/IP. Alternatively, the inter-SCP messages may be SS7 messages transmitted via WIN STP 408 and LEC STP 110.

With the MSL approach to wireless/wireline integration, services resident in one network can be made available to customers in the other network, as with the integration of wireline networks, described above. Thus, using the MSL approach, a customer subscribing to a wireline abbreviated dialing service for station 106 could use the same service when using his mobile station 404. Specifically, to provide this service, the MSL module of WIN SCP 410 would transmit an inter-SCP query to LEC SCP 102 to obtain the necessary information, i.e., the complete telephone number. This inter-SCP query would typically include information needed to process the service, such as the caller's telephone number, or other caller identification, and the dialed digits. MSL module 210 on LEC SCP 102 would then run the service logic module for this service to obtain the complete telephone number and would transmit the result to WIN SCP 410. WIN SCP 410 would then send the complete telephone number to MSC 406 in a response message, and MSC 406 would route the call from mobile station 404 accordingly.

Similarly, using the MSL approach, a customer with a terminating call screening feature for his mobile station 404 could have the service applied to his wireline station 106 as well. Such a terminating call screening feature may, for example, provide that during certain hours all calls would be screened except if they originated from certain telephone numbers. To accomplish this, MSL modules in LEC SCP 102 and in WIN SCP 410, where the service logic for this terminating call screening would reside, would facilitate the transfer of the necessary information from WIN SCP 410 and LEC SCP 102.

The MSL approach can thus provide advantages to many customers who have both wireline and wireless telephone service. Specifically, the MSL approach would enable a customer to use the same service provider for both wireline and wireless and telephone service and be able to have the same services in both networks.

The MSL approach could also be used between two wireless networks. This would require communication between the WIN SCP of each network, with each WIN SCP including an MSL module. This would allow the services a mobile customer has subscribed to in his home wireless network to be available when he is roaming, i.e., when he is in an area served by another wireless network.

Figure 8:
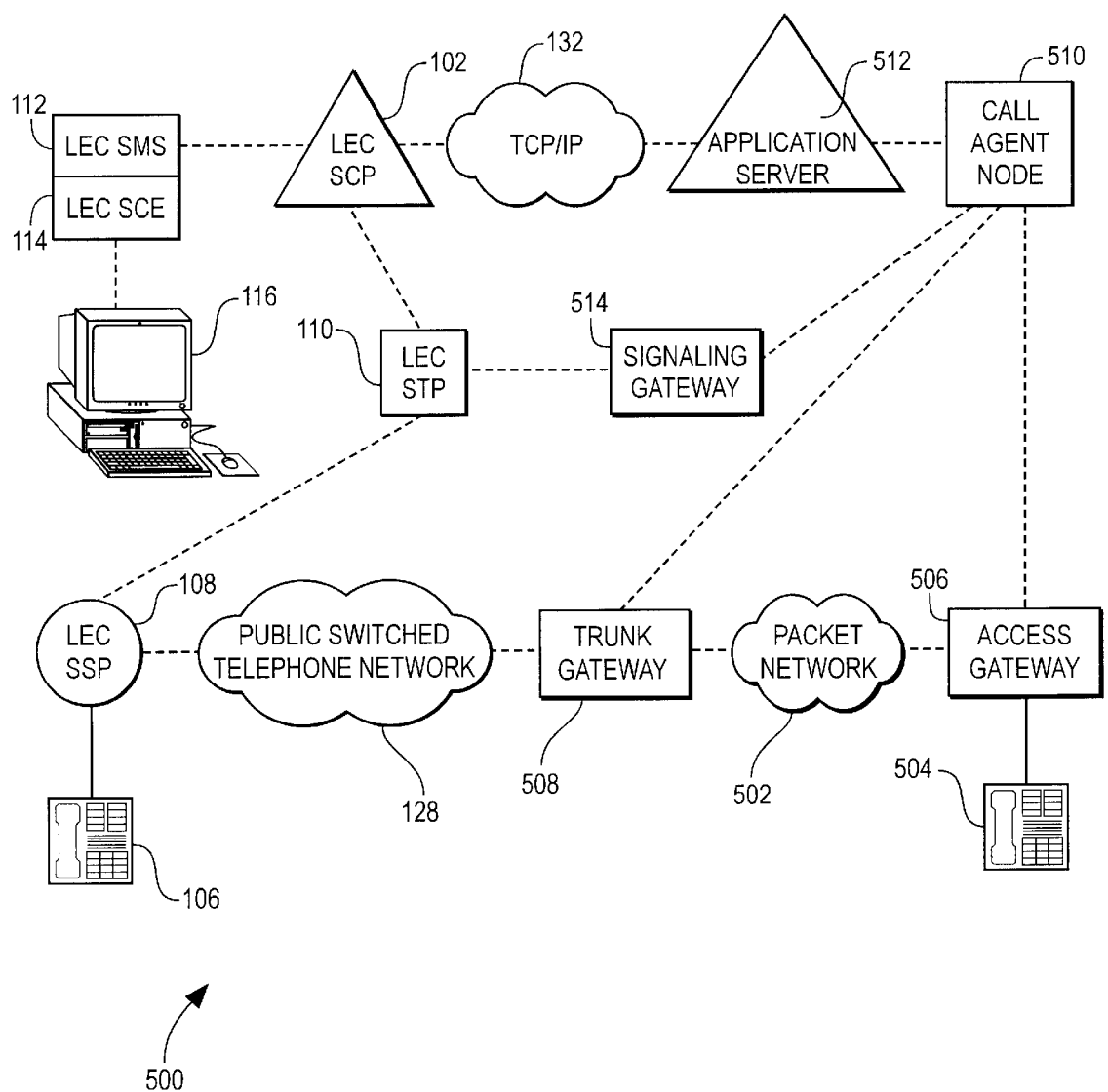
FIG. 8 is a block diagram illustrating an exemplary telecommunications network in accordance with an exemplary embodiment of the present invention.

The MSL approach is also able to effect integration with packet-based communications networks. An example of such a network is the Sprint ION$^{SM}$ network. Shown in FIG. 8 is an exemplary integrated network 500 that comprises a wireline circuit-switched network and a packet network. The wireline circuit-switched network includes a wireline station 106, LEC SSP 108, LEC STP 110, and LEC SCP 102, as discussed above. A packet network 502 is preferably a wide area network running IP over ATM (IP/ATM). A station 504 is connected to packet network 502 via an access gateway 506. Station 504 may be a telephone, fax machine, modem, or other such device. Access gateway 506 serves to packetize signals from station 504 to interface with packet network 502 and also assembles packets received from packet network 502 to provide signals for station 504. Packet network 502 is also connected to PSTN 128 via a trunk gateway 508. Trunk gateway 508 converts between the data packet format used in packet network 502 and the circuit-switched format used in PSTN 128.

Access gateway 506 is also connected to a call agent node 510 via a signaling pathway, which may be a wide area network using TCP/IP. The signaling between gateway 506 and call agent node 510 may use a protocol such as Bellcore's Simple Gateway Control Protocol ("SGCP") or Media Gateway Control Protocol ("MGCP"). Call agent node 510 contains connection manager, connection performer, and service management layers for routing calls through packet network 502. To take advantage of existing architecture, the service logic for providing telecommunications services typically resides on a separate application server 512 that is connected to call agent node 510, preferably through a wide area network running TCP/IP. Alternatively, instead of using a separate application server, the service logic could be programmed in to call agent node 510.

Call agent node 510 is also connected to a signaling gateway 514, preferably through a wide area network running TCP/IP. Signaling gateway 514 is, in turn, connected to the LEC's signaling network, such as by connection to LEC STP 110. Signaling gateway 514 converts between the signaling formats supported by call agent node 510, such as SR-3389, and the signaling format used by the LEC, such as SS7. Thus, signaling gateway 514 allows call agent node 510 to send signals to LEC SSP 108 and to receive signals from LEC SSP 108, via LEC STP 110.

When station 504 attempts to place a call to station 106, access gateway 506 sends a query message to call agent node 510 that includes the dialed digits. When call agent node 510 receives the query message, it attempts to set up a call by signaling LEC SSP 108 via signaling gateway 514 and LEC STP 110. If successful, call agent node 510 sends a response message to access gateway 506 that includes an address for access gateway 506 to use to reach trunk gateway 508 through packet network 502. If telecommunication services are required, call agent node 510 also queries application server 512 to invoke the necessary service logic.

When station 106 attempts to place a call to station 504, LEC SSP 108 sends an SS7 signal to signaling gateway 514 via LEC STP 110. Signaling gateway 514 translates and forwards the signal to call agent node 510. If access gateway 510 is available, control 510 signals access gateway 506 to accept the call. If telecommunication services are required, call agent node 510 queries application server 512 to invoke the necessary service logic. Thus, in the packet-based network, call agent node 510 and access gateway 506 together play a role analogous to that of an SSP and application server 512 plays a role analogous to an SCP.

In the MSL approach, LEC SCP 102 includes MSL module 210, as before, and application server 512 also includes a MSL module (not shown). In this way, the MSL module of LEC SCP 102 can invoke service logic resident on application server 512, and the MSL module of application server 512 can invoke service logic resident on LEC SCP 102.

This integration between wireline circuit-switched networks and packet networks affords a number of advantages. For example, a wireline circuit-switched customer could add a second telephone line that is part of a packet network and be able to have the circuit-switched services also available on his new packet line. Another example is that the flexibility afforded by packet switched networks may make some services, such as retrieval of e-mail messages, more readily available on packet networks than on wireline networks. Thus, the MSL approach may make it easier for wireline customers to invoke packet-based services.

Similarly, the MSL approach maybe used to integrate a wireless network with a packet network. This would make it easier for users of mobile stations to access packet-based services.

An exemplary embodiment of the present invention has been illustrated and described. It will be understood, however, that changes and modifications may be made to the invention without deviating from the spirit and scope of the invention, as defined by the following claims.

What is claimed is:

1. In a first telecommunications network having a call connection system in communication with a first network controller, said call connection system establishing a communication pathway through said first telecommunications network in response to messages from said first network controller, said first network controller having a plurality of service logic modules, said plurality of service logic modules including a first mediated service logic module and a plurality of non-mediated service logic modules, a method for providing telecommunications services comprising the steps of:

said first network controller receiving a query message from said call connection system, said query message including a first set of parameters;

determining an implicated service and a relevant customer from said first set of parameters;

obtaining a service profile for said relevant customer, said service profile identifying a predetermined service logic module to execute to provide said implicated service;

if said predetermined service logic module is one of said plurality of non-mediated service logic modules:
executing said predetermined service logic module to define a first set of output parameters;
formulating a first response message from said first set of output parameters; and
transmitting said response message to said call connection system;

if said predetermined service logic module is said first mediated service logic module:
executing said first mediated service logic module to define an internetwork query message, said internetwork query message having a format different from said query message from said call connection system;
transmitting said internetwork query message to a second network controller in a second telecommunications network;
receiving an internetwork response message from said second network controller, said internetwork response message including a second set of parameters;
formulating a second response message from said second set of parameters; and
transmitting said second response message to said call connection system.

2. The method of claim 1, wherein, said first network controller includes a mediation functionality, said method further comprising the step of said mediation functionality screening said second response message.

3. The method of claim 1, wherein said first telecommunications network is a circuit-switched wireline network.

4. The method of claim 3, wherein said first network controller is a service control point (SCP).

5. The method of claim 4, wherein said call connection system includes a service switching point (SSP).

6. The method of claim 1, wherein said first telecommunications network is a wireless network.

7. The method of claim 6, wherein said first network controller is a service control point (SCP).

8. The method of claim 7, wherein said call connection system includes a mobile switching center (MSC).

9. The method of claim 1, wherein said first telecommunications network is a packet network.

10. The method of claim 9, wherein said first network controller is an application server.

11. The method of claim 10, wherein said call connection system includes an access gateway and a call agent node.

12. The method of claim 1, wherein said second network controller is a service control point (SCP) and said second telecommunications network is a circuit-switched wireline network.

13. The method of claim 1, wherein said second network controller is a service control point (SCP) and said second telecommunications network is a wireless network.

14. The method of claim 1, wherein said second network controller is an application server and said second telecommunications network is a packet network.

15. The method of claim 1, wherein said second network controller includes a second mediated service logic module and a second service logic module.

16. The method of claim 15, further comprising the steps of:

said second network controller receiving said internetwork query message;

said second mediated service logic module obtaining a second set of input parameters from said internetwork query;

said second mediated service logic module passing said second set of input parameters to said second service logic module;

executing said service logic module to obtain a second set of output parameters;

said second mediated service logic formulating said internetwork query message from said second set of output parameters; and said second network controller transmitting said internetwork query message to said first network controller.

17. A system for communicating with a second network controller in a second telecommunications network to provide telecommunications services in a first telecommunications network, comprising:

a first network controller in said first telecommunications network;

a call connection system in said first telecommunications network, said call connection system sending query messages to said first network controller for requesting call processing instructions, said query messages including a first set of parameters, said call connection system establishing a communication pathway through said first telecommunications network in response to response messages from said first network controller;

a plurality of service logic modules disposed in said first network controller, said plurality of service logic modules including a plurality of non-mediated service logic modules and a first mediated service logic module, said first mediated service logic module being able to transmit an internetwork query message to said second network controller and to receive an internetwork response message from said second network controller when executed, said internetwork query message having a format different from said query messages from said call connection system;

a database of service profiles disposed in said first network controller, each one of said service profiles being associated with a particular customer and identifying which one of said plurality of service logic modules to execute to provide each service available to said particular customer;

a base service logic module disposed in said first network controller, said base service logic module determining an implicated service and a relevant customer from said first set of parameters, said base service logic module consulting said database to identify a service module to execute to provide said implicated service, said base service logic module executing said service logic module to obtain a first output if said service logic module is one of said plurality of non-mediated service logic modules, said base service logic module executing said service logic module to obtain a second output if said service logic module is said first mediated service logic module.

18. The system of claim 17, further comprising a mediation functionality disposed in said first network controller, said mediation functionality screening said second output.

19. The system of claim 17, wherein said first telecommunications network is a circuit-switched wireline network.

20. The system of claim 19, wherein said first network controller is a service control point (SCP).

21. The system of claim 20, wherein said call connection system includes a service switching point (SSP).

22. The system of claim 17, wherein said first telecommunications network is a wireless network.

23. The system of claim 22, wherein said first network controller is a service control point (SCP).

24. The system of claim 23, wherein said call connection system includes a mobile switching center (MSC).

25. The system of claim 17, wherein said first telecommunications network is a packet network.

26. The system of claim 25, wherein said first network controller is an application server.

27. The system of claim 26, wherein said call connection system includes an access gateway and a call agent node.

28. The system of claim 17, wherein said second network controller is a service control point (SCP) and said second telecommunications network is a circuit-switched wireline network.

29. The system of claim 17, wherein said second network controller is a service control point (SCP) and said second telecommunications network is a wireless network.

30. The system of claim 17, wherein said second network controller is an application server and said second telecommunications network is a packet network.

31. The system of claim 17, further comprising said second network controller.

32. The system of claim 31, wherein said second network controller includes a second mediated service logic module and a second service logic module, said second mediated service logic module executing said second service logic module in response to said internetwork query message.

33. In a first telecommunications network having a first network controller, a call connection system in communication with said first network controller, said call connection system sending query messages to said first network controller for requesting call processing instructions, said query messages including a first set of parameters, said call connection system establishing a communication pathway through said first telecommunications network in response to response messages from said first network controller, said first network controller having a plurality of service logic modules, said first network controller having a database of customer service profiles, said database of customer service profiles indicating which of said plurality of service logic modules to execute to provide which telecommunications services, said first network controller having a base service logic module, said base service logic module determining an implicated telecommunications service from said first set of parameters, said base service logic module determining from said database of customer service profiles which one of said plurality of service logic modules to execute to provide said implicated telecommunications service, a method for providing an additional telecommunications service, said method comprising the steps of:

adding a first mediated service logic module to said first network controller, said first mediated service logic module being able to transmit an internetwork query message to a second network controller in a second telecommunications network and to receive an internetwork response message from said second network controller when executed, said internetwork query message having a format different from said query messages from said call connection system; and updating said database of customer service profiles to indicate that said mediated service logic module is to be executed when said additional telecommunications service is implicated. logic module executing said second service logic module in response to said internetwork query message.

34. The method of claim 33, further comprising the steps of:

providing said second network controller with a second service logic module; and providing said second network controller with a second mediated service logic module, said second mediated service logic module receiving said internetwork query message and thereafter executing said second service logic module to obtain an output, said mediated service logic formulating said internetwork response message based on said output and transmitting said internetwork response message to said first network controller.

35. The method of claim 33, wherein said first network controller includes a service management system, and wherein said step of adding said first mediated service logic module includes the step of accessing said service management system.

36. The method of claim 33, wherein said first telecommunications network is a circuit-switched wireline network.

37. The method of claim 36, wherein said first network controller is a service control point (SCP).

38. The method of claim 37, wherein said call connection system includes a service switching point (SSP).

39. The method of claim 33, wherein said first telecommunications network is a wireless network.

40. The method of claim 39, wherein said first network controller is a service control point (SCP).

41. The method of claim 40, wherein said call connection system includes a mobile switching center (MSC).

42. The method of claim 33, wherein said first telecommunications network is a packet network.

43. The method of claim 42, wherein said first network controller is an application server.

44. The method of claim 43, wherein said call connection system includes an access gateway and a call agent node.

45. The method of claim 33, wherein said second network controller is a service control point (SCP) and said second telecommunications network is a circuit-switched wireline network.

46. The method of claim 33, wherein said second network controller is a service control point (SCP) and said second telecommunications network is a wireless network.

47. The method of claim 33, wherein said second network controller is an application server and said second telecommunications network is a packet network.

* * * * *